United States Patent [19]

Shatto, Jr.

[11] Patent Number: 4,769,773
[45] Date of Patent: Sep. 6, 1988

[54] VESSEL WAVE HEADING CONTROL APPARATUS

[75] Inventor: Howard L. Shatto, Jr., Houston, Tex.

[73] Assignee: Shell Offshore Inc., Houston, Tex.

[21] Appl. No.: 770,340

[22] Filed: Aug. 28, 1985

[51] Int. Cl.[4] ............................................ B63B 39/00
[52] U.S. Cl. ................................ 364/424.01; 318/588;
114/144 B; 73/178 R; 364/432
[58] Field of Search ............... 364/443, 434, 453, 466,
364/424, 432; 114/144 B; 73/180, 170 R, 189;
318/588

[56] References Cited

U.S. PATENT DOCUMENTS 3,844,242 10/1974 Sernatinger et al. ............... 318/588
3,854,333 12/1974 Richard ............................. 73/170 A
3,965,840 6/1976 Blumberg ......................... 364/432
4,089,287 5/1978 Kranert et al. ..................... 318/588
4,515,013 5/1985 Hue .................................. 73/170 A Primary Examiner—Parshotam S. Lall
Assistant Examiner—Thomas G. Black
Attorney, Agent, or Firm—Paul I. Douglas

[57] ABSTRACT

A vessel wave heading control apparatus is disclosed for use on a floating vessel. Linear acceleration signals from two accelerometers, which sense the rotational acceleration of the vessel due to waves which impact the vessel from a particular direction, are processed by a computer which subsequently produces vessel heading change signals to the steering and propulsion means of the vessel. These signals indicate the required heading and required rate of change of vessel heading necessary to turn the vessel into the direction of the oncoming waves in a timely manner.

1 Claim, 2 Drawing Sheets

VESSEL WAVE HEADING CONTROL APPARATUS

RELATED APPLICATION

This application is related to application Ser. No. 692,094 entitled "Ship Wave Heading Indication Method and Apparatus" by Howard L. Shatto, Jr., filed Jan. 17, 1985, now U.S. Pat. No. 4,633,710.

BACKGROUND OF THE INVENTION

1. Field of the Invention:

This invention relates to an apparatus used to position a floating vessel so as to place the bow of the vessel into the direction of approaching waves. Orientation of the vessel in this manner reduces the risk of the vessel capsizing, reduces discomfort, fatigue, and risk of injury to the crew, and reduces the wave drift forces tending to move the vessel off location if the vessel is moored with multiple anchors or by dynamic positioning.

2. Description of the Prior Art:

In a storm when waves become high enough even large vessels must turn the bow into oncoming waves to reduce the risk of damage and the possibility of capsizing. This is true of vessels traveling at sea from one point to another. It is also true with vessels moored on a location such as drilling vessels because with drilling vessels it is important even in lower sea states to point into the waves to reduce lateral movements of the vessel which cause much discomfort, fatigue, and hazard to the crew involved in the drilling operation.

Waves that impact a vessel at any angle except directly on the bow or stern cause lateral components of acceleration and vessel motion from yaw, sway, and roll. This lateral motion makes manual work most difficult; workers must brace themselves strongly and move with the vessel or walk from side to side to stay upright. Objects that are tied down strain their lashings and slide or roll and become dangerous if they break free. This lateral motion hampers crew operations, especially on vessels where manual labor must continue during adverse weather conditions, such as when an offshore drilling vessel is positioned over subsea wellheads.

In an attempt to reduce this lateral motion a system to turn a vessel into the waves was installed for use on a dynamically positioned vessel in 1980. The system would turn the vessel to port a few degrees, and then by monitoring an inclinometer measure any change in the magnitude of the roll angle of the vessel. If the roll angle decreased, the vessel was turned to port another increment. If the roll angle increased, the vessel was turned to starboard. This process was continued until the roll angle had decreased to a minimum, at which time the vessel would maintain this general heading, while still arbitrarily searching to port or starboard in an attempt to maintain the roll rate of the vessel at a minimum.

The arbitrary heading changes of the vessel as this system attempted to point the vessel into the waves was not well received by the crew of the vessel and the system was subsequently removed from operation.

A simpler apparatus was discovered Jan. 31, 1984, comprising a mass elastically suspended visually in front of the vessel's helmsman. The suspended mass duplicates the motion and direction of the wave particles which form the waves that impact the vessel, thereby informing the helmsman what heading the waves have relative to the vessel and thereby what direction to turn the vessel to head into the oncoming waves. Such a device is the object of the related patent application Ser. No. 692,094, now U.S. Pat. No. 4,633,710, entitled "Ship Wave Heading Indication Method and Apparatus" by Howard L. Shatto, Jr., filed Jan. 17, 1985.

The device, however, requires continuous monitoring by the helmsman at a time during foul weather conditions when his attention may be required elsewhere.

A system need be disclosed, therefore, that provides the operator a continuous indication of the wave direction and which can operate automatically to maintain the vessel turned into oncoming waves without the help of a helmsman and without the requirement of continuous change of the vessel heading in order to locate the minimum roll rate of the vessel. Such an apparatus should automatically determine what direction the vessel should be turned in order to reduce lateral motions and to minimize the risk of capsize of the vessel.

SUMMARY OF THE INVENTION

The novel apparatus of the present invention comprises two accelerometers mounted so that their sensing axis are located orthogonal to one another, both accelerometers being located in a plane formed substantially transverse to the longitudinal axis of the vessel. The accelerometers sense through the response of the vessel to the impact of oncoming waves the motion and direction of the wave particles that form the waves that impact the vessel. Linear acceleration signals produced by these accelerometers are then analyzed by a microprocessor which subsequently produces vessel heading change signals indicating the direction and magnitude of change of the vessel heading and which selectively activate the vessel's propulsion and steering system. In this manner the vessel's heading may be manually or automatically maintained in the direction of the oncoming waves.

It is an object of the present invention to provide a vessel with a vessel wave heading control and/or sensing apparatus that can determine the heading of waves which impact a vessel, and subsequently by manual or automatic means alter the heading of the vessel to turn the vessel into the oncoming waves.

It is a feature of the present invention to employ two accelerometers mounted orthogonal to one another in a plane formed transverse to the longitudinal axis of the vessel to sense the linear accelerations of the vessel and thereafter produce linear acceleration signals that may be utilized to alter the heading of the vessel.

These and other features, objects and advantages of the present invention will become apparent from the following detailed description, wherein reference is made to the Figures in the accompanying drawings.

DESCRIPTION OF THE PREFERRED EMBODIMENT

Figure 1:
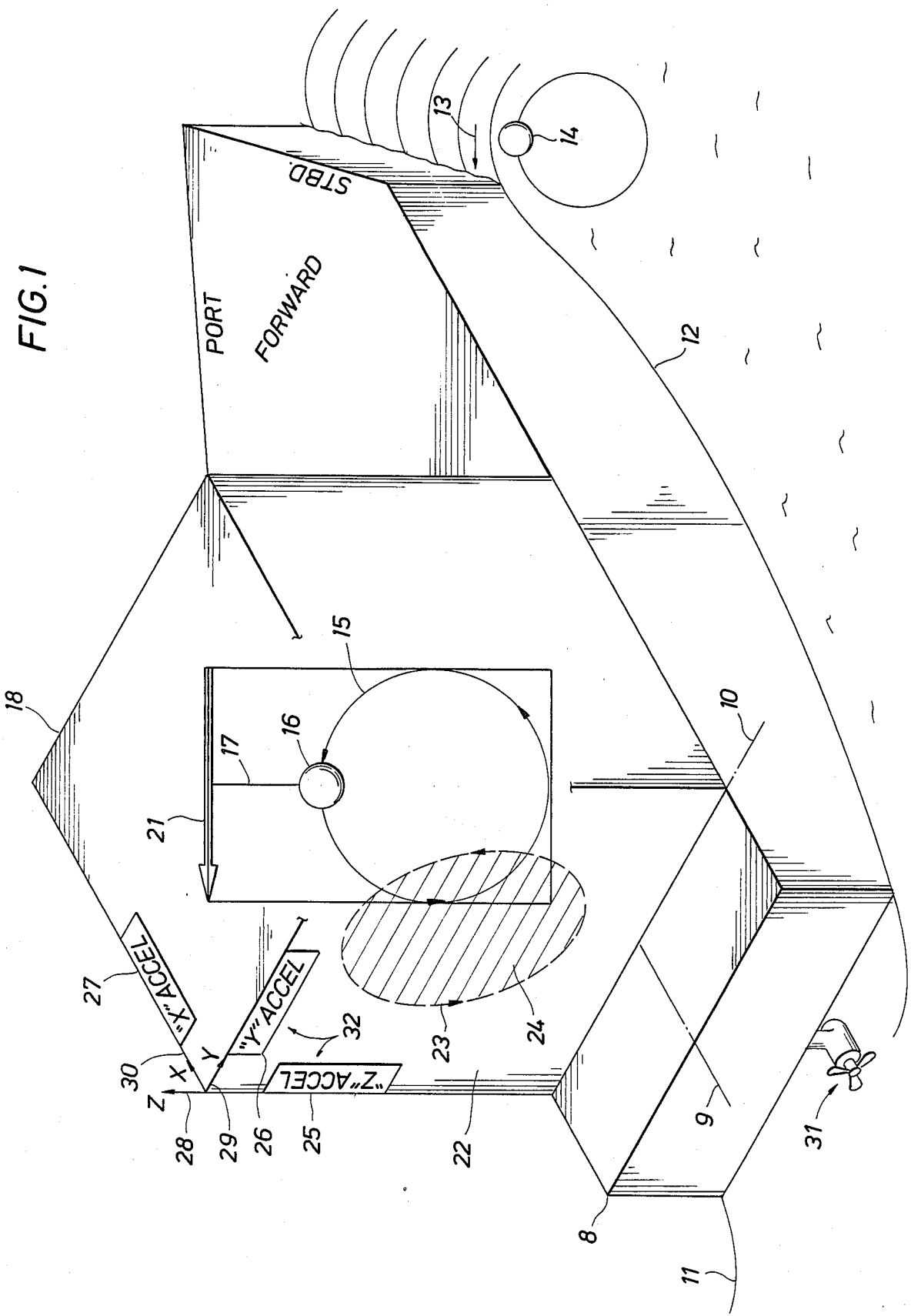
FIG. 1 is an isometric representation of a vessel subjected to wave impact from waves which impact the forward starboard side.

In order to explain the operation of the apparatus of the present invention, it is necessary first to examine in FIG. 1 the response of a mass 16 elastically suspended from a vessel 8 subjected to ocean waves 12. Such a suspended mass 16 forms the object of applicant's related application Ser. No. 692,094.

Referring now to FIG. 1, the vessel 8 can be seen to have a central longitudinal axis 9 defined along the length of the vessel 8, and a transverse axis 10 which intersects the longitudinal axis 9 at some point along the vessel's 8 length, the vessel 8 shown floating in a body of water 11. The body of water 11 is typically subjected to a combination of wind forces which cause the formation of a series of waves 12 which are shown traveling in a particular wave direction indicated by direction of wave impact arrow 13. Wave particles 14 which form a portion of the body of water 11 are known to move in an essentially circular orbit as the crest and trough of a wave 12 passes a particular location. Wave particle 14 is shown at the top of a circular orbit as the crest of a wave 12 passes the location of the particle 14.

The mass 16 elastically suspended from the vessel 8 by means of elastic member means 17, such as a rubber band tends to duplicate by following an orbital path 15 the motion and direction of the wave particles 14. If the mass 16 is elastically suspended from a viewing box 18 (formed for example from plexiglass), when the orbital path 15 of movement of the mass 16 is viewed from a vertical perspective the resulting observed wave direction 21 will generally coincide with the heading of the direction of wave impact arrow 13. It is recognized that because of the great difference in response of a long slender vessel 8 between surge and sway the direction of the plane of the orbital motion of the vessel 8 will only approximate the direction of the orbital plane of the wave particles 14. Although the sway response (waves on the larger beam area) is accentuated the vessel's 8 orbital direction will be in the same quadrant as that of the direction of wave impact arrow 13, and in any case the direction of movement of the mass 16 will correctly indicate the correct direction to turn the vessel 8 into the predominate waves 12.

For example, if the mass 16 is viewed from the transverse plane 22 which is formed substantially normal to the central longitudinal axis 9 of the vessel 8 counterclockwise mass movement 23 may be observed by the helmsman (not shown) when he is standing at the aft end of the vessel 8 and looking forward, if waves 12 impact the vessel 8 from the starboard side. With proper instruction the helmsman will then turn the vessel 8 to starboard thereby aligning the central longitudinal axis 9 substantially with the direction of wave impact arrow 13. As can be imagined, when the vessel 8 is turned into the waves 12, the mass 16 will be observed by the helmsman to fluctuate upwards and downwards and the net area circumscribed by mass 16 on transverse plane 22 will reduce to zero.

Alternatively, if the helmsman views the mass 16 from aft through the transverse plane 22 and observes the mass 16 having a clockwise direction of movement (not shown) then the helmsman will change the direction of the vessel 8 to port until the mass 16 is again moving substantially vertically upward and downward when again viewed through the transverse plane 22.

It can be seen that the area 24 circumscribed on transverse plane 22 will be at a maximum when the waves 12 are coming directly onto either the port or starboard side of the vessel 8 or either "beam". This indicates the condition of maximum discomfort for the crew and hazard to the vessel 8. The magnitude and direction of generation of this area 24 should then be an indication to the operator of a manual system of the urgency as well as direction of a needed turn.

The same acceleration forces which act upon the mass 16 and cause the mass 16 to follow a particular orbital path 15 may also be sensed by accelerometers, such as the first linear accelerometer 25 shown located on a first orthogonal axis 28, a second linear accelerometer 26 shown located on a second orthogonal axis 29 and a third linear accelerometer 27 shown located on a third orthogonal axis 30.

In the simplest terms the first linear accelerometer 25 and second linear accelerometer 26 sense orthogonal portions of the linear acceleration of the vessel 8 and subsequently produce signals which are analyzed and modified sufficiently to actuate the propulsion and steering system 31 to turn the vessel 8 into the direction of wave impact 13 of the waves 12. Note that the third linear accelerometer 27 is not necessarily required to be included in the system of the present invention.

Figure 2:
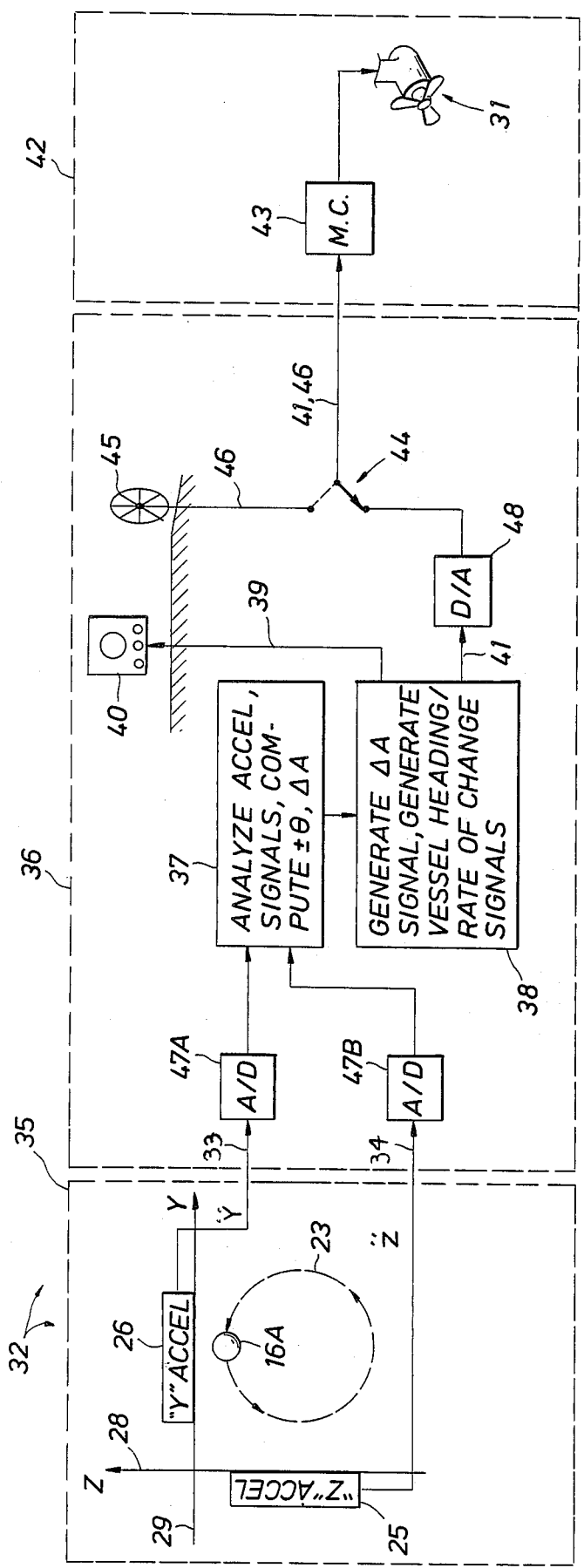
FIG. 2 is a schematic representation of the vessel wave heading control apparatus, with accelerometers shown producing linear acceleration signals to the vessel heading change signal generation means, which subsequently produce vessel heading change signals to the vessel heading change means.

Referring now to FIGS. 1 and 2 the acceleration sensing means 35 of the vessel wave heading control apparatus 32 can be seen to consist in a preferred embodiment of the first and second linear accelerometers 25, 26 respectively that are used to sense linear acceleration of the vessel 8 along axes such as the first and second orthogonal axis 28, 29, respectively. Axes 28, 29 are shown located in the transverse plane 22 that is defined substantially normal to the longitudinal axis 9 of the vessel 8. The accelerometers 25, 26 produce linear acceleration signals 33, 34 that represent the linear acceleration of the vessel 8 along axes 28, 29.

It is well recognized that the axes 28, 29 located in the transverse plane 22 need not be mutually orthogonal to one another in order for the accelerometers 25, 26 to generate sufficiently accurate linear acceleration signals 33, 34 to subsequently steer the vessel 8 into the waves 12. It is merely sufficient that the sensing axes of the accelerometers 25, 26 not be oriented parallel to one another while located within the transverse plane 22. Sound engineering design, however, dictates that the acceleration sensing means 35 be positioned to sense and produce the linear acceleration signals 33, 34 along the first orthogonal axis 28 and the second orthogonal axis 29, where both axes 28, 29 are positioned mutually orthogonal to one another and located in the transverse plane 22. It is also well recognized that the transverse plane 22 need not be aligned perfectly normal to the central longitudinal axis 9 of the vessel for the linear accelerometers 25, 26 to generate the sufficiently accurate linear acceleration signals 33, 34 required to steer the vessel 8 into the waves 12.

In a preferred embodiment, it is recognized that the first orthogonal axis 28 may be defined vertically upward relative to the vessel 8, which would orient the second orthogonal axis 29 in a substantially horizontal plane.

Referring now to FIG. 2 the vessel heading change signal generation means 36 receives the linear acceleration signals 34, 33 from the acceleration sensing means 35. Apparatus within the vessel heading change signal generation means 36 thereafter defines the change in the vessel 8 heading necessary to head the vessel 8 into the direction of wave impact 13. The rate of change of the vessel 8 heading may also be defined by the signal generation means 36. The vessel heading change signal generation means 36 thereafter produces vessel heading change signals having values representing the direction and rate of vessel heading change necessary to head the vessel 8 in a timely manner into the direction of wave impact 13.

Figure 3:
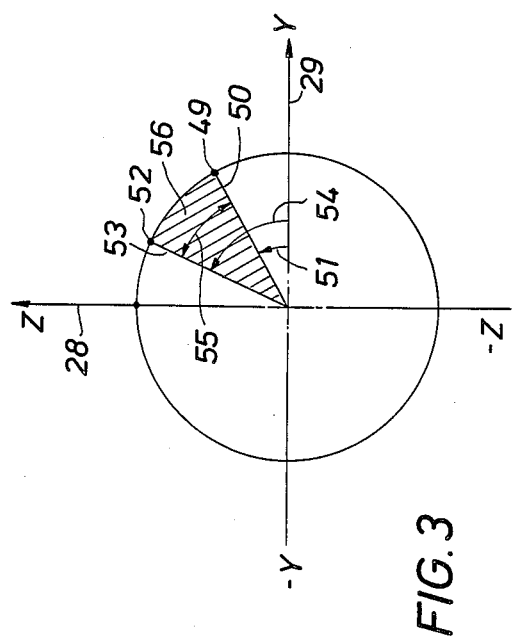
FIG. 3 is a representative plot showing the conversion of the values of the linear acceleration signals to polar coordinates.

In a preferred embodiment generation of the vessel heading change signals may be accomplished by incorporation of computation means 37 such as a microprocessor well known to the art within the vessel heading change signal generation means 36. The computation means 37 are capable of receiving the linear acceleration signals 33, 34 from the acceleration sensing means 35 and subsequently converting the signals 33, 34 to sets for example of polar coordinates (as discussed more fully in FIG. 3), which represent the value of the linear acceleration signals 33, 34 at particular periods of time. As explained later the computation means 37 may calculate the value of an angle defined between two dissimilar sets of polar coordinates and also calculate the value of an area defined between the same two dissimilar sets of polar coordinates and subsequently produce the values of the angle and of the area to signal generation means 38 capable of receiving the values produced by the computation means 37. It is well recognized that the signal generation means 38 may be incorporated into the computation means 37.

The signal generation means 38 then produce helm signals to a helm indicator 40 such as a digital display well known to the art located adjacent the helmsman, the helm signals 39 presented on the helm indicator 40 to indicate the direction to head the vessel 8 into the direction of wave impact 13, and further indicating the rate to head said vessel 8 into the direction of the wave impact 13.

The signal generation means 38 also produce automatic vessel heading change signals 41 which when received by the vessel heading change means 42, cause the vessel 8 to head into the direction of wave impact 13 at a particular rate of heading change.

The vessel heading change means 42 in a preferred embodiment consists of a propulsion and steering system having for example a motor and steering controller 43 well known to the art. Vessel heading change means 42 are capable of receiving the vessel heading change signals from the vessel heading change signal generation means 36 and thereafter changing the heading of the vessel 8 at a particular rate.

Reception of the automatic vessel heading change signal 41 by the vessel heading change means 42 assumes of course that a switching means 44 is selected to receive the automatic vessel heading change signals 41 from the signal generation means 38. Switching means 44 may also be capable of receiving the manual vessel heading change signal 46 generated by manual operation of helm means 45, such as a vessel's 8 manual steering mechanism well known to the art, by for example the helmsman (not shown) of the vessel 8. The helm means 45 in a preferred embodiment are carried by the vessel 8 and are manually operable to produce the manual vessel heading change signals 46. The manual signals 46 when received by the vessel heading change means 42 cause the vessel 8 at a particular rate to steer to a new vessel heading which would place the longitudinal axis 9 of the vessel 8 parallel to the direction of wave impact 13, assuming that the helmsman (not shown) has correctly studied the helm signals 39 presented on helm indicator 40.

The switching means 44 therefore are capable of receiving both the automatic vessel heading change signal 41 and the manual vessel heading change signal 46 and thereafter are capable of producing one of the vessel heading change signals 41, 46 to the vessel heading change means 42.

In simplest terms then, the helmsman may control the direction and rate of turn of vessel 8 by study of the helm indicator 40 and subsequent correct actuation of helm means 45 in order to steer the vessel 8 manually to a particular heading. Assuming a properly qualified helmsman this mode of operation would be the safest mode for the entire vessel and crew. Alternatively, at times when the helmsman cannot be stationed adjacent the helm means 45 switching means 44 may be selected to the auto position and automatic vessel heading change signals 41 may then be received by the vessel heading change means 42 to head the vessel 8 into a particular direction of wave impact 13 at a particular rate of change, depending upon the urgency of the situation.

It is well recognized that if a digital format is required for the acceleration signals 33, 34 to be inputed into the computation means 37, analog to digital converter means 47A, 47B may be used to change the linear acceleration signals 33, 34 from analog to digital format. Additionally, digital to analog converter means 48 may be used if required to convert the output of the signal generation means 38 from a digital to an analog format by means well known to the art. It is well recognized of course that computation means 37 and/or signal generation means 38 may be of an analog design and such analog to digital conversion devices 47A, 47B and digital to analog conversion device 48 may not be required.

The microprocessor which forms in a preferred embodiment the computation means 37 may analyze the linear acceleration signals 33, 34 by use of software programmed into the microprocessor. It is well recognized that many different software designs may be employed to convert the acceleration signals 33, 34 to appropriate vessel heading change signal 41 or helm signal 39, depending upon the mathematical modeling process used to interpret the acceleration signals 33, 34.

In a preferred embodiment the linear acceleration signals 33, 34 may be considered as indicating the acceleration of hypothetical mass 16A which is shown in FIG. 2 having a counterclockwise movement 23 relative to the Cartesian coordinate axes "Y" 29 and "Z" 28. The software may be designed to convert the acceleration signals 33, 34 into a polar coordinate reference system as shown more specifically in FIG. 3, by means well known to the art.

For example, linear acceleration signals 33, 34 may be converted to a first set of polar coordinates 49 at time $T_1$ having values $Y_1$, $Z_1$. Radius $R_L$ 50 and angle L 51 defined by the first set of polar coordinates 49 may then be calculated by equations well known to the art. Linear acceleration signals 33, 34 may be converted to a second set of polar coordinates 52 having values $Y_2$, $Z_2$ at time $T_2$, time $T_2$ occurring an incremental period of time after time $T_1$. New radius $R_N$ 53 and a new angle N 54 may then be calculated by means well known to the art. The difference between the two angles 54, 51 may then be represented by angle $\theta$ 55, which will typically have either a positive or negative value.

If $\theta$ 55 is positive, then the vectors formed by radii $R_L$ 50 and $R_N$ 53 are progressing around the origin of axis 28, 29 in a counterclockwise direction. If $\theta$ 55 is negative, in a clockwise direction. The incremental area $A_\Delta$ 56 enclosed within the angle $\theta$ 55 can now be calculated using the following equation:

$$A_\Delta = (R_L R_N \theta)/2$$

The sign (positive or negative) of this area $A_\Delta$ 56, is controlled by the sign of the angle $\theta$ 55 and therefore indicates the direction that the vessel 8 should be turned to place the bow into the predominate direction of wave impact 13. For example, if area $A_\Delta$ 56 is positive, then the vessel 8 should be turned to starboard. The magnitude of this area $A_\Delta$ 56 indicates the severity of lateral acceleration and the urgency of the need to turn the vessel 8 into the direction of wave impact 13. Referring once again to FIG. 2 helm signals 39 will present on helm indicator 40 a positive or negative value of $\theta$ 55 (or of area $A_\Delta$ 56) in order to inform the helmsman which direction to steer the vessel 8. The magnitude of the incremental area $A_\Delta$ 56 values will inform the helmsman of the urgency and therefore the required rate that vessel 8 should be turned toward the direction of wave impact 13. The larger the value of $A_\Delta$ 56, the larger the desired rate of turn. The same values of $\theta$ 55 and the incremental area $A_\Delta$ 56 may be used to form components of the automatic vessel heading change signal 41 in order to turn the vessel 8 towards the direction of wave impact 13 at a particular rate of turn or rate of change of vessel heading.

To provide improved stability of measurement for indication and control, the new incremental area $A_\Delta$ 56 can be added to a decaying residual value of the sum of previous area measurements given for example by the value $A_R$, as shown in the following equation:

$$A_s = A_R(F) + A_\Delta,$$

where F is a suitable decay factor (such as 0.9) and $A_s$ is the stabilized summation of areas $A_\Delta$ 56. In this case with each successive measurement the previous value of $A_s$ becomes the new value of $A_R$.

It is well recognized that many other mathematical algorithms may be used by the microprocessor which forms the computation means 37 to accomplish similar mathematical and mechanical results. If the computation means 37 comprises a microprocessor having software written to continuously analyze the linear acceleration signals 33, 34, the signals 33, 34 may be studied and the heading of the vessel 8 adjusted even during times when the motion of the hypothetical mass 16A (FIG. 2) is not in a purely elliptical orbit. For example, as the vessel 8 becomes aligned with the direction of wave impact 13 the orbital path of the mass 15 (FIG. 1) may change from a substantially elliptical orbit to one in the form of a "figure 8". The software program can analyze such an orbital path taking into acount the swept areas $A_\Delta$ 56 of the upper and lower portions of the "figure 8" and subsequently adjust the course of the vessel 8 in a manner to give the most credence to that portion of the "figure 8" with the largest swept surface area, by means well known to the art.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Vessel wave heading control apparatus for controlling the heading of a vessel relative to a direction of wave impact of waves which impact said vessel from a particular direction, said vessel having a central longitudinal axis defined along the length of said vessel and a transverse plane defined substantially normal to said longitudinal axis, said vessel wave heading control apparatus comprising;

acceleration sensing means immovably attached to said vessel further comprising a first linear accelerometer and a second linear accelerometer, said accelerometers sensing and producing linear acceleration signals representing linear accelerations of the vessel along a first orthogonal axis and a second orthogonal axis, both axes mutually orthogonal to one another and located in said transverse plane, vessel heading change signal generation means for generating vessel heading change signals, said vessel heading change signal generating means receiving said linear acceleration signals from said acceleration sensing means, defining the change in the vessel heading necessary to head said vessel into the direction of wave impact, defining the rate of change of the vessel heading, and thereafter producing said vessel heading change signals, said signals having values representing the direction and rate of vessel heading change necessary to head the vessel into the direction of wave impact, and vessel heading change means for changing at a selected rate the heading of said vessel, capable of receiving said vessel heading change signals from said vessel heading change signal generation means and thereafter changing the heading of said vessel at a particular rate.

* * * * *